(12) United States Patent
Maki et al.

(10) Patent No.: US 7,243,229 B2
(45) Date of Patent: Jul. 10, 2007

(54) EXCLUSIVE ACCESS CONTROL APPARATUS AND METHOD

(75) Inventors: Nobuhiro Maki, Sagamihara (JP); Naoko Iwami, Sagamihara (JP); Hiroshi Yamada, Kawasaki (JP); Hiroshi Kurokawa, Hadano (JP)

(73) Assignee: Hitachi, Ltd., Tokyo (JP)

( * ) Notice: Subject to any disclaimer, the term of this patent is extended or adjusted under 35 U.S.C. 154(b) by 531 days.

(21) Appl. No.: 10/261,767

(22) Filed: Oct. 2, 2002

(65) Prior Publication Data

US 2003/0110157 A1    Jun. 12, 2003

(30) Foreign Application Priority Data

Oct. 2, 2001    (JP)    ............................. 2001-306176

(51) Int. Cl.
*H04L 9/00*    (2006.01)

(52) U.S. Cl. .......................... 713/164; 713/153; 707/2; 711/147; 711/150; 711/154

(58) Field of Classification Search ................ 713/182, 713/164
See application file for complete search history.

(56) References Cited

U.S. PATENT DOCUMENTS

| 4,467,421 | A | * | 8/1984 | White | 711/118 |
| 5,392,433 | A | * | 2/1995 | Hammersley et al. | 710/200 |
| 5,515,538 | A | * | 5/1996 | Kleiman | 710/260 |
| 5,544,339 | A | * | 8/1996 | Baba | 711/114 |
| 5,666,511 | A | * | 9/1997 | Suganuma et al. | 711/114 |
| 5,696,933 | A | * | 12/1997 | Itoh et al. | 711/114 |
| 5,790,775 | A | * | 8/1998 | Marks et al. | 714/9 |
| 5,892,955 | A | * | 4/1999 | Ofer | 710/200 |
| 5,907,672 | A | * | 5/1999 | Matze et al. | 714/8 |
| 5,913,227 | A | * | 6/1999 | Raz et al. | 711/152 |
| 5,941,972 | A | * | 8/1999 | Hoese et al. | 710/315 |
| 5,978,839 | A | * | 11/1999 | Okuhara et al. | 709/215 |
| 5,987,550 | A | * | 11/1999 | Shagam | 710/119 |
| 6,044,442 | A | * | 3/2000 | Jesionowski | 711/153 |

(Continued)

OTHER PUBLICATIONS

Silberschatz et al., Applied Operating System Concept, 2000, John Wiley & Sons, Inc, chapters 6, 8-9, pp. 135-167, 227-248, 255-293.*

(Continued)

*Primary Examiner*—Nasser Moazzami
*Assistant Examiner*—David Garcia Cervetti
(74) *Attorney, Agent, or Firm*—Mattingly, Stanger, Malur & Brundidge, P.C.

(57) ABSTRACT

A computing system and an exclusive access control method are provided for preventing degraded performance of a network caused by exclusive access control, and for permitting a computer to exclusively access a storage area irrespective of whether a storage has an exclusive access control function. In the computing system in which a plurality of computers and an external storage device storing shared data are connected through a relay, exclusive access control is executed by a device other than the storage. Specifically, the relay having a virtualizing function is instructed to execute exclusive access control. The relay has information indicating whether a storage area on the storage is an exclusive access area, so that the relay determines based on this information whether an access request received from a computer requests an access to an exclusive access area, and executes exclusive access control when it is an access request.

14 Claims, 7 Drawing Sheets

| | | EXCLUSIVE ACCESS ATTRIBUTE OF EXCLUSIVE ACCESS AREA | | | |
|---|---|---|---|---|---|
| | | READ SHARED | EXCLUSIVE WRITE | EXCLUSIVE READ | READ/WRITE EXCLUSIVE |
| INPUT ACCESS REQUEST | SET EXCLUSIVE AREA (READ SHARED) | AVAILABLE | NOT AVAILABLE | NOT AVAILABLE | NOT AVAILABLE |
| | SET EXCLUSIVE AREA (EXCLUSIVE READ) | NOT AVAILABLE | NOT AVAILABLE | AVAILABLE | NOT AVAILABLE |
| | SET EXCLUSIVE AREA (EXCLUSIVE WRITE) | NOT AVAILABLE | AVAILABLE | NOT AVAILABLE | NOT AVAILABLE |
| | SET EXCLUSIVE AREA (READ/WRITE EXCLUSIVE) | NOT AVAILABLE | NOT AVAILABLE | AVAILABLE | NOT AVAILABLE |
| | READ ACCESS | AVAILABLE | AVAILABLE | NOT AVAILABLE | NOT AVAILABLE |
| | WRITE ACCESS | NOT AVAILABLE | NOT AVAILABLE | AVAILABLE | NOT AVAILABLE |

U.S. PATENT DOCUMENTS

| | | | | |
|---|---|---|---|---|
| 6,061,753 | A * | 5/2000 | Ericson | 710/107 |
| 6,073,218 | A * | 6/2000 | DeKoning et al. | 711/150 |
| 6,076,126 | A * | 6/2000 | Shagam | 710/108 |
| 6,145,006 | A * | 11/2000 | Vishlitsky et al. | 709/229 |
| RE36,989 | E * | 12/2000 | White | 711/118 |
| 6,185,575 | B1 * | 2/2001 | Orcutt | 707/200 |
| 6,192,408 | B1 * | 2/2001 | Vahalia et al. | 709/229 |
| 6,209,066 | B1 * | 3/2001 | Holzle et al. | 711/153 |
| 6,247,099 | B1 * | 6/2001 | Skazinski et al. | 711/141 |
| 6,321,298 | B1 * | 11/2001 | Hubis | 711/124 |
| 6,343,324 | B1 * | 1/2002 | Hubis et al. | 709/229 |
| 6,353,612 | B1 * | 3/2002 | Zhu et al. | 370/360 |
| 6,377,958 | B1 * | 4/2002 | Orcutt | 707/200 |
| 6,393,535 | B1 * | 5/2002 | Burton et al. | 711/158 |
| 6,421,711 | B1 * | 7/2002 | Blumenau et al. | 709/213 |
| 6,421,753 | B1 * | 7/2002 | Hoese et al. | 710/315 |
| 6,425,035 | B2 * | 7/2002 | Hoese et al. | 710/315 |
| 6,425,036 | B2 * | 7/2002 | Hoese et al. | 710/315 |
| 6,438,661 | B1 * | 8/2002 | Beardsley et al. | 711/144 |
| 6,453,383 | B1 * | 9/2002 | Stoddard et al. | 711/112 |
| 6,457,098 | B1 * | 9/2002 | DeKoning et al. | 711/114 |
| 6,484,245 | B1 * | 11/2002 | Sanada et al. | 711/164 |
| 6,502,174 | B1 * | 12/2002 | Beardsley et al. | 711/170 |
| 6,523,096 | B2 * | 2/2003 | Sanada et al. | 711/152 |
| 6,587,970 | B1 * | 7/2003 | Wang et al. | 714/47 |
| 6,601,128 | B1 * | 7/2003 | Burton et al. | 710/316 |
| 6,606,690 | B2 * | 8/2003 | Padovano | 711/148 |
| 6,654,902 | B1 * | 11/2003 | Brunelle et al. | 714/4 |
| 6,714,952 | B2 * | 3/2004 | Dunham et al. | 707/204 |
| 6,772,309 | B1 * | 8/2004 | Ohr et al. | 711/163 |
| 6,779,083 | B2 * | 8/2004 | Ito et al. | 711/114 |
| 6,804,794 | B1 * | 10/2004 | Robidoux et al. | 714/5 |
| 6,816,891 | B1 * | 11/2004 | Vahalia et al. | 709/214 |
| 6,862,613 | B1 * | 3/2005 | Kumar et al. | 709/220 |
| 6,907,457 | B2 * | 6/2005 | Merrell et al. | 709/223 |
| 6,912,636 | B1 * | 6/2005 | Bromley et al. | 711/165 |
| 6,938,136 | B2 * | 8/2005 | Garimella et al. | 711/162 |
| 6,944,734 | B2 * | 9/2005 | Anzai et al. | 711/163 |
| 6,952,737 | B1 * | 10/2005 | Coates et al. | 709/229 |
| 6,971,016 | B1 * | 11/2005 | Barnett | 713/182 |
| 2002/0019935 | A1 * | 2/2002 | Andrew et al. | 713/165 |
| 2002/0107877 | A1 * | 8/2002 | Whiting et al. | 707/204 |
| 2002/0184516 | A1 * | 12/2002 | Hale et al. | 713/200 |

OTHER PUBLICATIONS

"Draft Proposed American National Standard for Information Systems-SCSI-3 Primary Commands", Mar. 28, 1997, pp. 70-72 and pp. 88-93.*

"Draft Proposed American National Standard for information systems-SCSI-3 Primary Commands", Mar. 28, 1997, pp. 70-72 and 88-93.

* cited by examiner

FIG. 5

| | | EXCLUSIVE ACCESS ATTRIBUTE OF EXCLUSIVE ACCESS AREA | | | |
|---|---|---|---|---|---|
| | | READ SHARED | EXCLUSIVE WRITE | EXCLUSIVE READ | READ/WRITE EXCLUSIVE |
| INPUT ACCESS REQUEST | SET EXCLUSIVE AREA (READ SHARED) | AVAILABLE | NOT AVAILABLE | NOT AVAILABLE | NOT AVAILABLE |
| | SET EXCLUSIVE AREA (EXCLUSIVE READ) | NOT AVAILABLE | NOT AVAILABLE | AVAILABLE | NOT AVAILABLE |
| | SET EXCLUSIVE AREA (EXCLUSIVE WRITE) | NOT AVAILABLE | AVAILABLE | NOT AVAILABLE | NOT AVAILABLE |
| | SET EXCLUSIVE AREA (READ/ WRITE EXCLUSIVE) | NOT AVAILABLE | NOT AVAILABLE | AVAILABLE | NOT AVAILABLE |
| | READ ACCESS | AVAILABLE | AVAILABLE | NOT AVAILABLE | NOT AVAILABLE |
| | WRITE ACCESS | NOT AVAILABLE | NOT AVAILABLE | AVAILABLE | NOT AVAILABLE |

FIG. 6

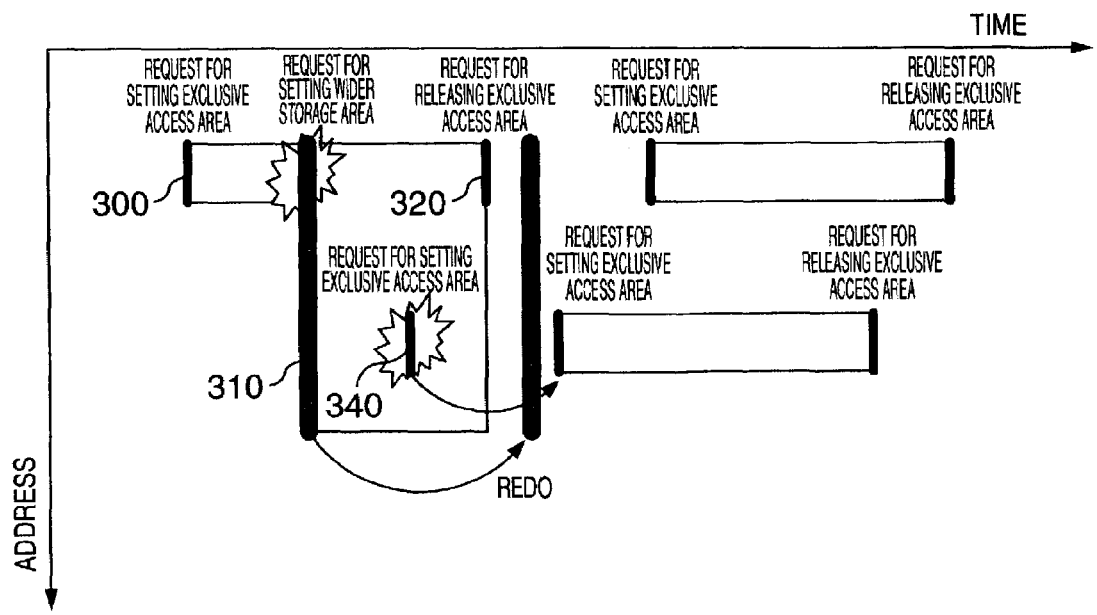

FIG. 9

| | VOLUME 0 | |
|---|---|---|
| | COMPUTER 0 | COMPUTER 1 |
| | 0 | 0 |
| | 1 | 0 |
| | 0 | 1 |
| | 1 | 0 |
| | 0 | 0 |
| | 0 | 0 |
| | 0 | 0 |
| | 0 | 0 |
| | 0 | 1 |
| | 0 | 0 |
| | 0 | 0 |

LOGICAL BLOCK ADDRESS ↓

| VOLUME 1 | |
|---|---|
| COMPUTER 0 | COMPUTER 1 |
| 0 | 0 |
| 0 | 0 |
| 0 | 0 |
| 0 | 0 |
| 0 | 0 |
| 1 | 1 |
| 0 | 0 |
| 0 | 0 |
| 0 | 0 |
| 0 | 0 |
| 0 | 0 |

2200

EXCLUSIVE ACCESS CONTROL APPARATUS AND METHOD

BACKGROUND OF THE INVENTION

The present invention relates to a computing system which comprises a plurality of computers, each of which independently executes operational processing, an external storage device which stores shared data accessed by the plurality of computers, and a relay device which receives a request for an access to data stored in the external storage device from each of the plurality of computers to relay the access request to the external storage device.

With an increase in the amount of data used in computers, techniques have been utilized for connecting a plurality of storage devices external to the computers through a network. According to the techniques, data stored in the storage devices connected to the network can be shared by a plurality of computers connected to the network. When a plurality of computers share data stored in a storage device, the consistency of data must be ensured by an exclusive access control or other techniques for limiting accesses to data from remaining computers while the data is being accessed by a certain computer. One of techniques which implements the exclusive access control employs Reverse/Release commands in the SCSI protocol described in "Draft Proposed American National Standard for Information System SCSI-3 Primary Commands," 28 Mar., 1997, pp. 70-72 and pp. 88-93 (hereinafter called the "prior art document"). This technique enables the exclusive access control in logical block addresses.

SUMMARY OF THE INVENTION

The exclusive access control described in the prior art document is executed by a storage device.

When a computer has acquired a right for exclusively accessing (hereinafter called the "exclusive access right") a storage area (hereinafter called the "shared area") of a storage device which stores data shared by a plurality of computers (hereinafter called the "shared data"), if a request for an access is issued to the shared area intended by an exclusive access right (hereinafter called the "exclusive access area"), this access request is rejected. In this event, the storage device transmits an access rejection response to the computer. When the computer which has received the access rejection response again issues an access request, the access rejection responses and access requests are frequently issued between the storage device and computer to consume the band of a network to which the storage device is connected, causing a degraded performance of the network. This results not only in degraded performance of the network between the computer which has acquired the exclusive access right and the storage device but also in degraded performance of the network between another computer which accesses an area other than the exclusive access area and the storage device.

Also, the exclusive access control described in the prior art document is not specified as an essential function of the SCSI protocol. Therefore, some storage devices are not installed with the exclusive access control function, so that the computing system cannot occasionally execute the exclusive access control.

Further, in a computing system including a plurality of storage devices connected to a network, storage devices having the exclusive access control function and storage devices not having the exclusive access control function can mixedly exist in the computing system. In this event, a storage device having the exclusive access control function must be selected in order for the computing system to execute the exclusive access control, however, such a selection is difficult.

In a computing system which has a virtualization function for providing computers with a virtual storage area (hereinafter called the "virtual volume"), since storage areas of storage devices are virtualized, the characteristics possessed by the storage devices and storage areas are concealed. It is therefore difficult to make up a virtual volume only from storage areas of storage devices having the exclusive access control function to provide computers with the virtual volume.

It is an object of the present invention to provide a computing system and an exclusive access control method which are capable of preventing degraded performance of a network, caused by an exclusive access control, and of permitting a computer to have an exclusive access to a storage area irrespective of whether or not a storage device has an exclusive access control function.

In the present invention, the exclusive access control function is implemented in a device other than a storage device. Specifically, the exclusive access control is executed by a relay device which is connected to a plurality of computers and a storage device through transmission paths. For this purpose, the relay device has information indicative of whether or not a storage area in the storage device is an exclusive access area. Based on this information, the relay device determines whether or not a request for an access to a storage area accepted from a computer is intended for the exclusive access area. When the access request is intended for the exclusive access area, the relay device transmits an access rejection response to the computer.

The other objects, features and advantages of the present invention will become apparent from the following description of embodiments of the present invention in connection with the accompanying drawings.

BRIEF DESCRIPTION OF THE DRAWINGS

FIG. 5 is a diagram showing whether or not an access is accepted depending on the difference in the type of exclusive access area in the embodiment of FIG. 4;

FIG. 6 is an illustration showing an example of an exclusive access control method in the present invention;

FIG. 9 is an example of an access log table according to another embodiment of the present invention;

DESCRIPTION OF THE EMBODIMENTS

Figure 1:
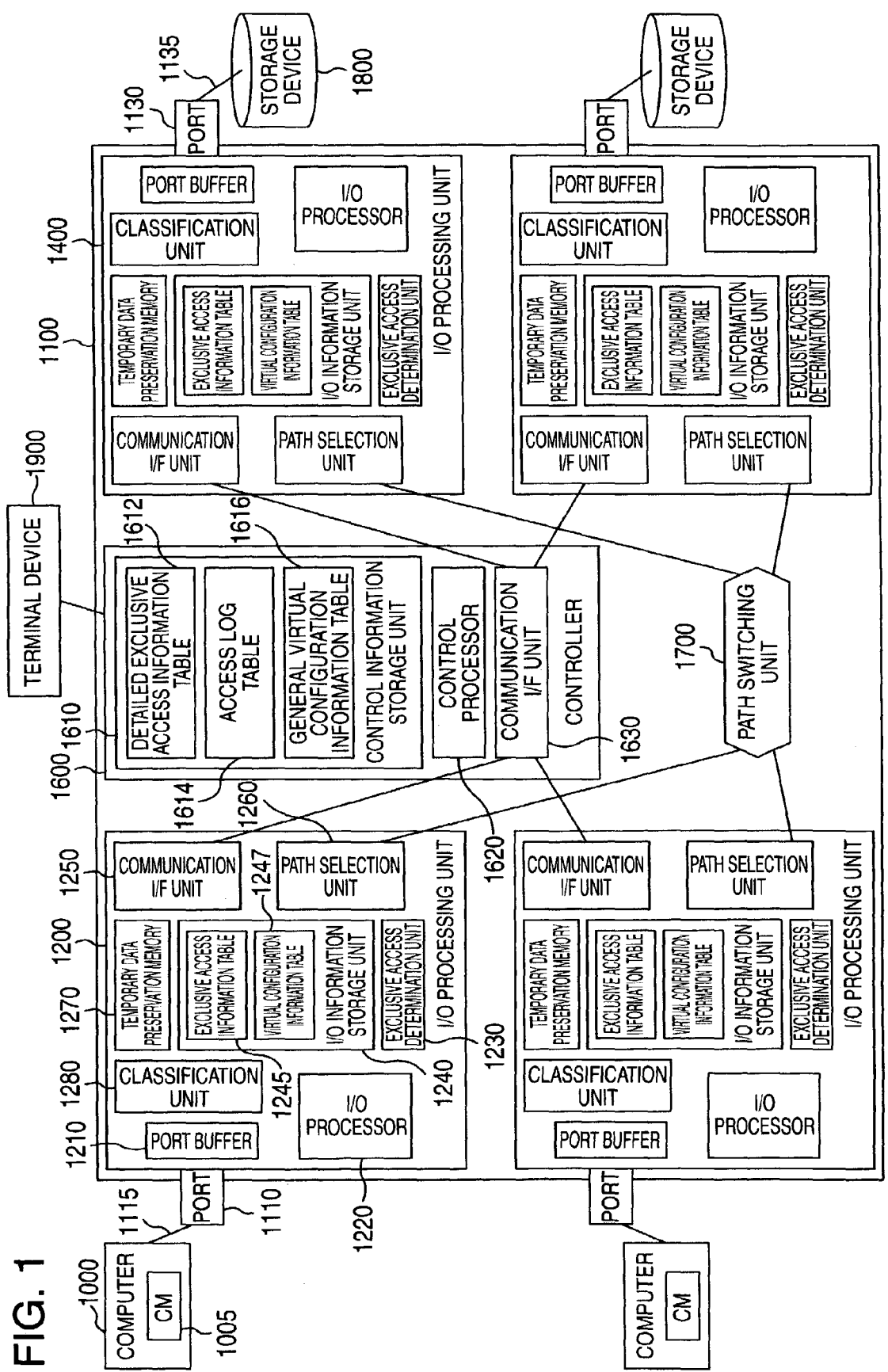
FIG. 1 is a block circuit diagram of a computing system according to one embodiment of the present invention.

Embodiments of the present invention will be described with reference to the drawings. It should be understood that the present invention is not limited to them. FIG. 1 illustrates an embodiment of a computing system in the present invention. The computing system comprises a plurality of computers 1000; one or a plurality of storage devices 1800; a relay device 1100 connected to each of the plurality of computers 1000 and the one or plurality of storage devices 1800 through a communication path 1110 and a communication path 1130; and a terminal device 1900 connected to the relay device 1100 through a communication path for remote operation.

The relay device 1100 comprises a port 1110 for connection with a computer; a port 1130 for connection with a storage device; an I/O processing unit 1200 connected to the port 1110; an I/O processing unit 1400 connected to the port 1130; a controller 1600 for controlling the relay device 1100; and a switching unit 1700 for switching a path between the I/O processing units.

The I/O processing units 1200 and 1400 each comprise a port buffer 1210 connected to the port 1110 or port 1130 for temporarily storing data received from the port or data transmitted from the port; an I/O processor 1220 for controlling the I/O processing unit 1200; an exclusive access control unit 1230 for determining whether or not a request received by the I/O processing unit is a request related to the exclusive access control; an I/O information storage unit 1240 which is a memory for storing a virtual information table 1247 and an exclusive access information table 1245, later described; a temporary data preservation memory 1270 for temporarily storing data received by the I/O processing unit; an communication interface (I/F) unit 1250 for communicating with the controller 1600; a path selection unit 1260 for connection with the path switching unit 1700; and a classification unit 1280 for classifying an access request received from a computer into a request for an access to a storage area which requires virtualization and a request for an access to a storage area which does not require the virtualization. These components are interconnected through communication paths such as internal buses (not shown). While this embodiment shows an example in which the classification unit 1280 and exclusive access determination unit 1230 are implemented in hardware, the I/O processor 1220 may execute a program stored in the I/O information storage unit 1240 to implement the classification unit 1280 and determination unit 1230.

The controller 1600 comprises a control information storage unit 1610 which is a memory for storing detailed exclusive access information 1612, an access log table 1614 and a general virtual configuration information table 1616, later described; a control processor 1620 for controlling the controller 1600; and a communication I/F unit 1630 for connection with the I/O processing units 1200, 1400. These components are interconnected through internal communication paths such as internal buses (not shown).

The path switching unit 1700 comprises a switch and the like.

The computer 1000 comprises a processor (not shown), a main storage device (not shown), and a cache memory 1005 for temporarily storing data transmitted and received through a communication path 1115. These components are interconnected through internal communication paths such as internal buses (not shown).

Figure 11:
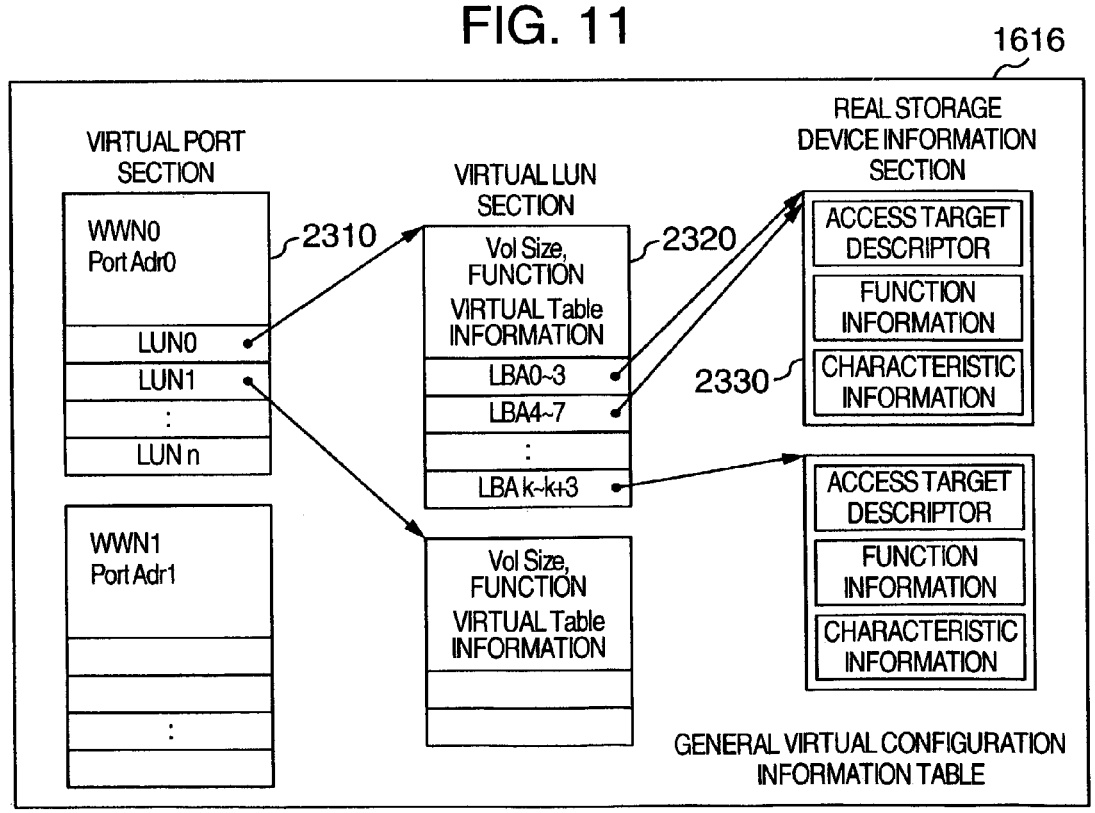
FIG. 11 shows an example of a general virtual configuration information table.

1. Method of Setting Virtualization in Relay Device:

First, a method of setting virtualization in the relay device 1100 will be described with reference to FIGS. 1 and 11. The setting of virtualization in the relay device refers to a setting of the configuration for a virtual volume, performed before the virtualization is processed. The virtualization processing in turn refers to the processing for providing a computer with a specified number of virtual volumes which have specified capacities and functions.

The setting of virtualization consists of two processing steps: a step of registering set contents for the relay device by a manager of the storage device through the terminal device 1900, and a step of validating the set contents.

The step of registering set contents first registers the general virtual configuration information table 1616 with the capacity of a virtual volume, a correspondence relationship between the virtual volume and an actual storage area (hereinafter called the "real volume") within the storage device, and functions possessed by the virtual volume, in accordance with instructions inputted from the manager to the terminal device 1900. Next, in accordance with instructions inputted to the terminal device 1900, a virtual input/output port (hereinafter called the "virtual port") is assigned to the virtual volume, and identification information on the assigned input/output port is registered in the general virtual configuration information table 1616. Here, the general virtual configuration information table 1616 is comprised of three information sections: a virtual port section 2310, a virtual logical unit (LUN) section 2320, and a real storage device information section 2330 shown in FIG. 11. The virtual port section holds a port address of the virtual port, an address to the virtual LUN section, and the like. The virtual LUN section holds header information such as the capacity of a virtual LUN, functional information and virtual table information, and an address to the real storage device information section 2330 for each particular logical block address (LBA). The virtual table information holds an I/O processing unit which locally has the virtual LUN section as bit map information. The real storage device information section holds an access target descriptor (comprised of a real port address and a LUN number), functions, and characteristic information of a real storage device.

Next, the relay device examines the functions and characteristic of a storage device which contains a real volume that forms part of the virtual volume, and registers the result of the examination in the general virtual configuration information table 1616 as an attribute of the storage device. Alternatively, the functions and characteristic of the storage device may be registered in the general virtual configuration information table 1616 based on information inputted from the manager to the terminal device. Here, the functions of the storage device include, for example, the presence/absence of the exclusive access control function of the storage device, while the characteristic of the storage device includes the capacity of a real volume in the storage device. Next, the relay device assigns a virtual address to a virtual port for enabling an access to the virtual port from a computer, assigns a virtual logical unit number (hereinafter called the "virtual LUN") to the virtual volume for enabling an access from the computer to the virtual volume assigned to the virtual port, and registers the virtual address of the virtual port and the virtual LUN in the general virtual configuration information table 1616.

As the manager of the computing system specifies the validation of registered contents for each of arbitrary virtual ports registered in the general virtual configuration information table 1616 through the terminal device 1900, the computer can confirm the existence of the virtual volume.

2. Operation of Relay Device:

Referring next to FIG. 1, description will be made on an outline of the processing executed by the relay device 1100 when the relay device receives a request from the computer 1000 for an access to a storage area in the storage device.

The computer 1000 issues an access request frame to the relay device 1100 for accessing a shared data stored in the storage device 1800. The relay device 1100 receives the access request frame transmitted from the computer through the port 1110, and stores the access request frame in the port buffer 1210 in the I/O processing unit 1200.

The classification unit 1280 detects that the access request frame is stored in the port buffer 1210, and extracts a header in the access request frame. The header includes ID of an originator of the access request frame; an access target ID (address of virtual port); information indicative of the type of the frame; a sequential number; and the like. Here, the type of the frame may be a frame having a command descriptor block of the storage device; a response frame from the storage device; a write enable response frame from the storage device, and the like. The classification unit 1280 examines the information indicative of the type of the frame in the extracted header to analyze the frame. Upon detecting that the access request frame has a command descriptor block as a result of the analysis, the classification unit 1280 extracts the command descriptor block and virtual LUN. Here, the command descriptor block refers to a command for operating the storage device, and includes read related commands for reading data from the storage device; write related commands for writing data into the storage device; state configuration reference related commands for referencing the configuration of the storage device; and exclusive access control related commands for requesting the exclusive access control. The exclusive access control related commands includes an exclusive access area setting request, and an exclusive access area release request. After extracting the command descriptor block and virtual LUN, the classification unit 1280 creates an internal message having header information, command descriptor block, virtual LUN, and information on the interior of the relay device.

The classification unit 1280 next examines whether the virtualization processing is required. The necessity for the virtualization processing is determined by the classification unit which compares the access target ID and the virtual LUN included in the header of the access request frame (hereinafter a combination of the access target ID and the virtual LUN is called the "access target descriptor") with the access target descriptor registered in the virtual configuration information table 1247. Here, the virtual configuration information table 1247 is stored in the I/O information storage unit 1240 of the I/O processing unit. The virtual configuration information table 1247 stores a subset of configuration information previously set in accordance with information inputted from the manager of the computing system through the terminal device 1900, and a full set of virtualization configuration information is stored in the general virtual configuration information table 1616 in the controller shown in FIG. 11.

When the access target descriptor matches the virtual port address and virtual LUN registered in the virtual configuration information table, the classification unit 1280 acquires an access target descriptor of a real volume of the storage device (hereinafter called the "real access target descriptor") corresponded to the virtual port address and virtual LUN from the virtualization configuration information table, and inserts the real access target descriptor into the aforementioned internal message. Then, the classification unit 1280 transmits the internal message to the I/O processor 1220 and exclusive access determination unit 1230.

On the other hand, when the access target descriptor does not match the virtual port address and virtual LUN registered in the virtual configuration information table, the classification unit 1280 clearly describes in the internal message that the access target descriptor does not match, inserts the access target descriptor into the internal message, and transmits the internal message to the I/O processor.

Upon receipt of the internal message which clearly describes that the access target descriptor does not match, the I/O processor transmits an internal message to the controller 1600 for requesting an examination as to whether or not the access target descriptor matches a virtual port address and a virtual LUN registered in the general virtual configuration information table 1616. In the controller, the control processor 1620 searches the general virtual configuration information table 1616 to check whether or not the table is registered with a virtual port address and a virtual LUN which match the access target descriptor stored in the received internal message.

When the general virtual configuration information table is registered with the virtual port address and virtual LUN which match the access target descriptor, the control processor 1620 reads virtual configuration information associated with the access descriptor in the general virtual configuration information table 1616, and transmits the virtual configuration information to the referencing I/O processing unit. Also, the control processor adds the ID of the referencing I/O processing unit to the virtual configuration information associated with the virtual port address and virtual LUN in the general virtual configuration information table 1616 as associated information. Upon receipt of the virtual configuration information from the control processor 1620, the I/O processing unit registers the received virtual configuration information in the virtual configuration information table 1247 under the control of the I/O processor 1220. Subsequently, the classification unit 1280 executes processing similar to the processing when the access target descriptor included in the aforementioned access request matches the virtual port address and virtual LUN registered in the virtual configuration information table 1247.

On the other hand, when the general virtual configuration information table is not registered with the virtual port address and virtual LUN which match the access target descriptor, the control processor 1620 notifies the referencing I/O processing that the access target descriptor has not been registered. In the I/O processing unit which receives the notification, the classification unit 1280 transmits the internal message to the path selection unit 1260 without adding any modifications to the internal message which has the command descriptor block.

After transmitting the internal message, the classification unit 1280 stores the access request frame received from the computer in the temporary data preservation memory 1270.

Upon receipt of the internal message, the I/O processor 1220 starts the virtualization processing. The I/O processor 1220 manages a correspondence relationship between a virtual volume provided to the computer 1000 and the real storage device 1800 using the virtual configuration information table 1247. The I/O processor 1220 converts the access target descriptor in the access request frame received from the computer to a real access target descriptor stored in the received internal message. When a virtual volume indicated by the access target descriptor in the access request frame received from the computer comprises real volumes in two or more storage devices, the I/O processor creates access request frames for these two or more storage devices based on the access request frame. The I/O processor 1220 reflects the result of the processing to the internal message received from the classification unit 1280. More specifically, the I/O processor 1220 writes a converted access target descriptor into the internal message when it converts the access target descriptor, and creates a number of internal messages as much as created accessed request frames when it creates the access request frames. After reflecting the result of the processing to the internal message, the I/O processor 1220 does not proceed with the virtualization processing until it receives a particular signal from the exclusive access determination unit 1230. Upon receipt of this signal, the I/O processor 1220 performs, in accordance with the type of the received signal, the processing for returning a response to the computer 1000; the processing for returning a response based on the command descriptor block stored in the internal message to the computer 1000; or the processing for transmitting the internal message to the storage device. For transmitting the internal message to the storage device, the I/O processor 1220 transmits the internal message to the path selection unit 1260.

The exclusive access determination unit 1230 performs an exclusive access determination, later described, based on the internal message received from the classification unit 1280. As a result of the determination, if the access request received from the computer does not require the exclusive access control, the exclusive access determination unit 1230 transmits to the I/O processor 1220 a signal indicating that the exclusive access control is not required. When the access request requires the exclusive access control, the exclusive access determination unit adds information indicating that the exclusive access control is required to the internal message received from the classification unit 1280 for making a more detailed exclusive access determination, and transmits this to the controller 1600 through the communication I/F unit. The controller 1600 makes a detailed exclusive access determination in consideration of dead lock, later described, and transmits the result of the determination to an I/O processing unit registered in the general virtual configuration information table 1612 associated with the real access target descriptor stored in the internal message.

The path selection unit 1260 transmits the received internal message and the access request frame stored in the temporary data storage memory 1270 to the I/O processing unit 1400 in the storage device through the path switching unit 1700 based on the description in the real access target descriptor in the internal message. Upon receipt of the internal message and access request, the I/O processing unit removes the internal message, changes the ID of the access request frame originator stored in the access request frame to the ID of the relay device, and transmits the access request frame to the storage device from the port.

Figure 7:
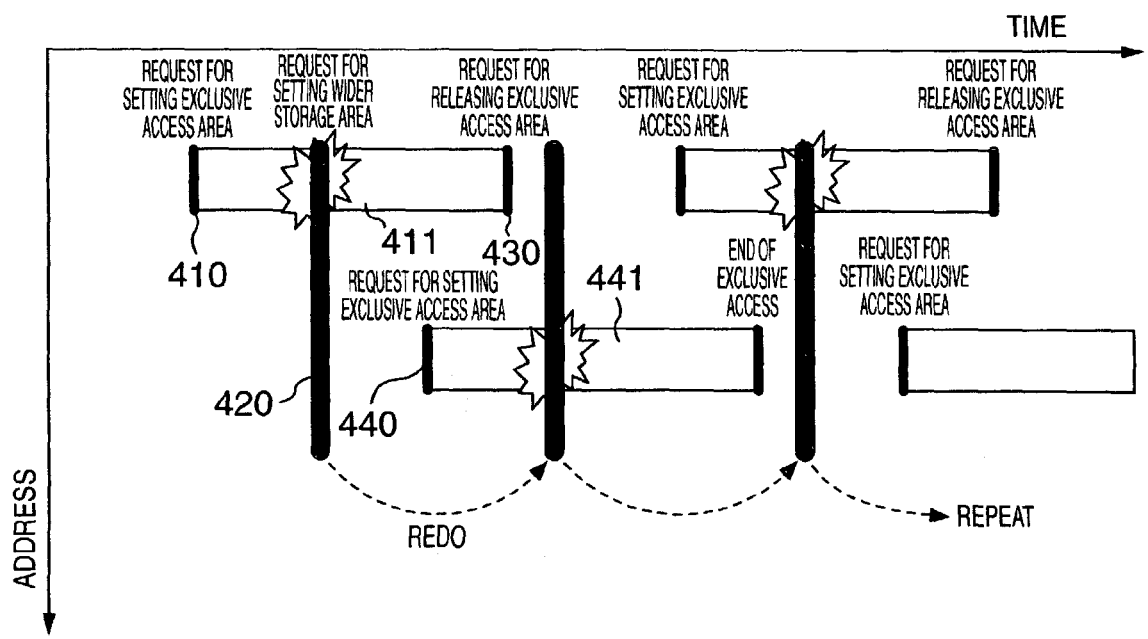
FIG. 7 is an illustration showing an example of an exclusive access control method which does not expand an exclusive access area in the present invention.
Figure 8:
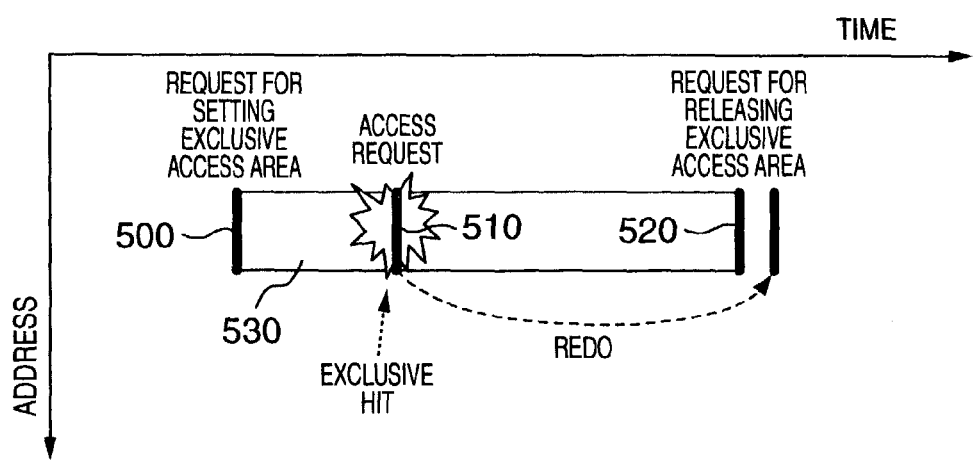
FIG. 8 is an illustration showing another example of the exclusive access control method in the present invention.

3. Outline of Exclusive Access Control:

Next, the exclusive access control in the present invention will be outlined with reference to FIGS. 7 and 8.

FIG. 8 shows how an exclusive access area setting request 500, a storage area access request 510 issued for reading/writing data, and an exclusive access area release request 520 are processed in time series. As a certain computer issues the exclusive access area setting request 500, a storage area indicated by the exclusive access area setting request 500 is set as an exclusive access area 530, and the relay device is notified to that effect. Therefore, if another computer issues an access request 510 for a storage area including the exclusive access area 530, this access request 510 is inhibited by the relay device 1100. In this way, issuance of an access request by another computer for a storage area set as an exclusive access area by a request from a certain computer is called an "exclusive hit." The access request 510 once inhibited is again issued from the computer. If the computer which had issued the exclusive access area setting request 500 has already issued the exclusive access area release request 520 to release the exclusive access control for the exclusive access area 530 when the access request 510 is issued again, the access request 510 is not inhibited but processed. Such an exclusive access control permits the computer which has issued the exclusive access area setting request 500 to exclusively access the exclusive access area until it issues the exclusive access area release request 520. In the foregoing example, the access request 510 has the same start address and access width as the exclusive access area setting request 500.

FIG. 7 shows an example in which the access request 420 has a larger access width than the exclusive access area setting request 410. When a first computer issues an exclusive access area setting request 410, a storage area indicated by the exclusive access area setting request 410 is set as an exclusive access area 411, and the relay device is also notified to that effect. Next, as a second computer issues an access request 420 for a storage area including the exclusive access area 411, this access request 420 is inhibited by the relay device because it is an exclusive hit for the exclusive access area 441. Next, a third computer issues an exclusive access area setting request 440 for another storage area 441 which does not include the exclusive access area 411. Then, the storage area 411 is set as an exclusive access area 441 for the third computer, and this fact is registered in the relay device. Subsequently, even if the first computer has already issued an exclusive access area release request 430 for the exclusive access area 411 when the second computer issues again the access request 420, the re-issued access request 420 causes an exclusive hit to the exclusive access area 441 of the third computer at this time, so that the access request 420 is inhibited again by the relay device. In this way, when the access width specified by an access request is larger than the width of an exclusive access area, the access request can be repeatedly issued. This phenomenon is called "dead lock."

For avoiding the occurrence of dead lock, the present invention executes an exclusive access control shown in FIG. 6. After a first computer has issued an exclusive access area setting request 300, a second computer issues an access request 310 for a storage area which includes an exclusive access area set by the exclusive access area setting request 300 and is wider than the exclusive access area, in which case the access request 310 causes an exclusive hit to the exclusive access area of the first computer, so that the access request 310 is inhibited by the relay device. In this event, the relay device 1100 expands the exclusive access area to an access width of the access request 310 received from the second computer at the time the exclusive hit occurs. With the expanded exclusive access area, when the third computer subsequently issues an exclusive access area setting request 340 for a storage area included in the expanded exclusive access area, the exclusive access area setting request 340 is inhibited by the relay device because it requests to set an exclusive access area in the expanded exclusive access area. When the first computer issues an exclusive access area release request 320, the expanded exclusive access area is released from the exclusive access control. Therefore, when the second computer subsequently issues again the access request 310, this access request is not inhibited by the relay device but is processed. The access request 310 may be issued again by the relay device after the relay device releases the exclusive access control for the expanded exclusive access area.

Figure 2:
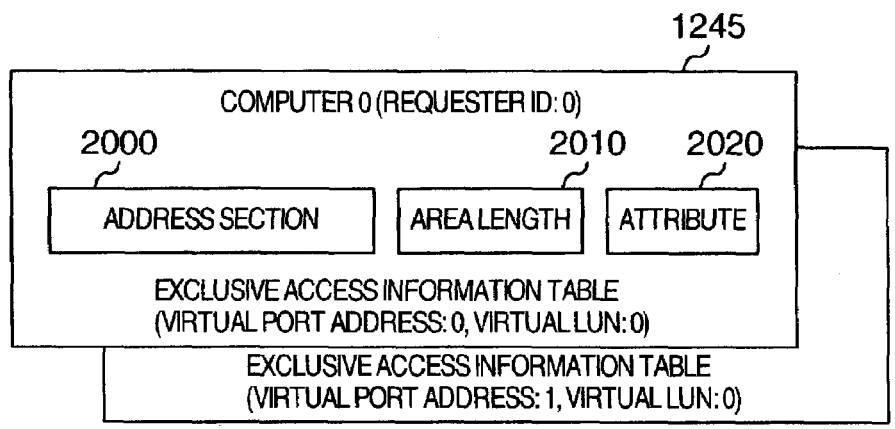
FIG. 2 is an example of an exclusive access information table in an input/output (I/O) processing unit in a relay device in the embodiment.

4. Processing Operation of Exclusive Access Control:

FIG. 2 is a diagram showing an example of the exclusive access information table 1245 stored in the I/O processing unit. The exclusive access information table exists for each virtual volume presented to a computer connected to the I/O processing unit, and stores an address 2000, an area length 2010, and an I/O attribute 2020 in entries for each computer. The address refers to the start address of an exclusive access area; the area length refers to the number of logical blocks in the exclusive access area; and the I/O attribute refers to the type of the exclusive access control (read shared, exclusive write, exclusive read, read/write exclusive), and an identification number (reservation ID) of the exclusive access control.

Figure 3:
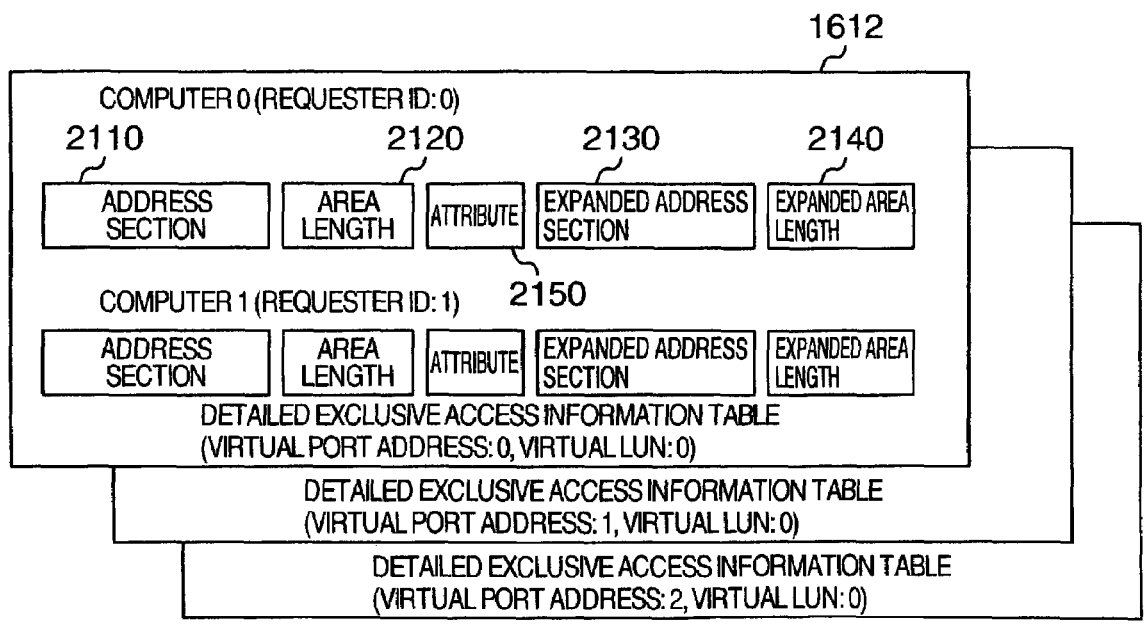
FIG. 3 is an example of a detailed exclusive access information table in a controller in the relay device in the embodiment.

FIG. 3 is a diagram showing an example of the detailed exclusive access information table 1612 stored in the controller 1600. The detailed exclusive access information table 1612 exists for each virtual volume presented to a computer connected to each of the I/O processing units in the relay device, and stores in entries for each computer the start address of an expanded exclusive access area (expanded address 2130), and the number of logical blocks in the expanded exclusive access area (expanded area length 2140) when the exclusive access area is expanded for executing the exclusive access control, in addition to the same information (address 2110, area length 2120, I/O attribute 2150) managed by the exclusive access information table.

Figure 4:
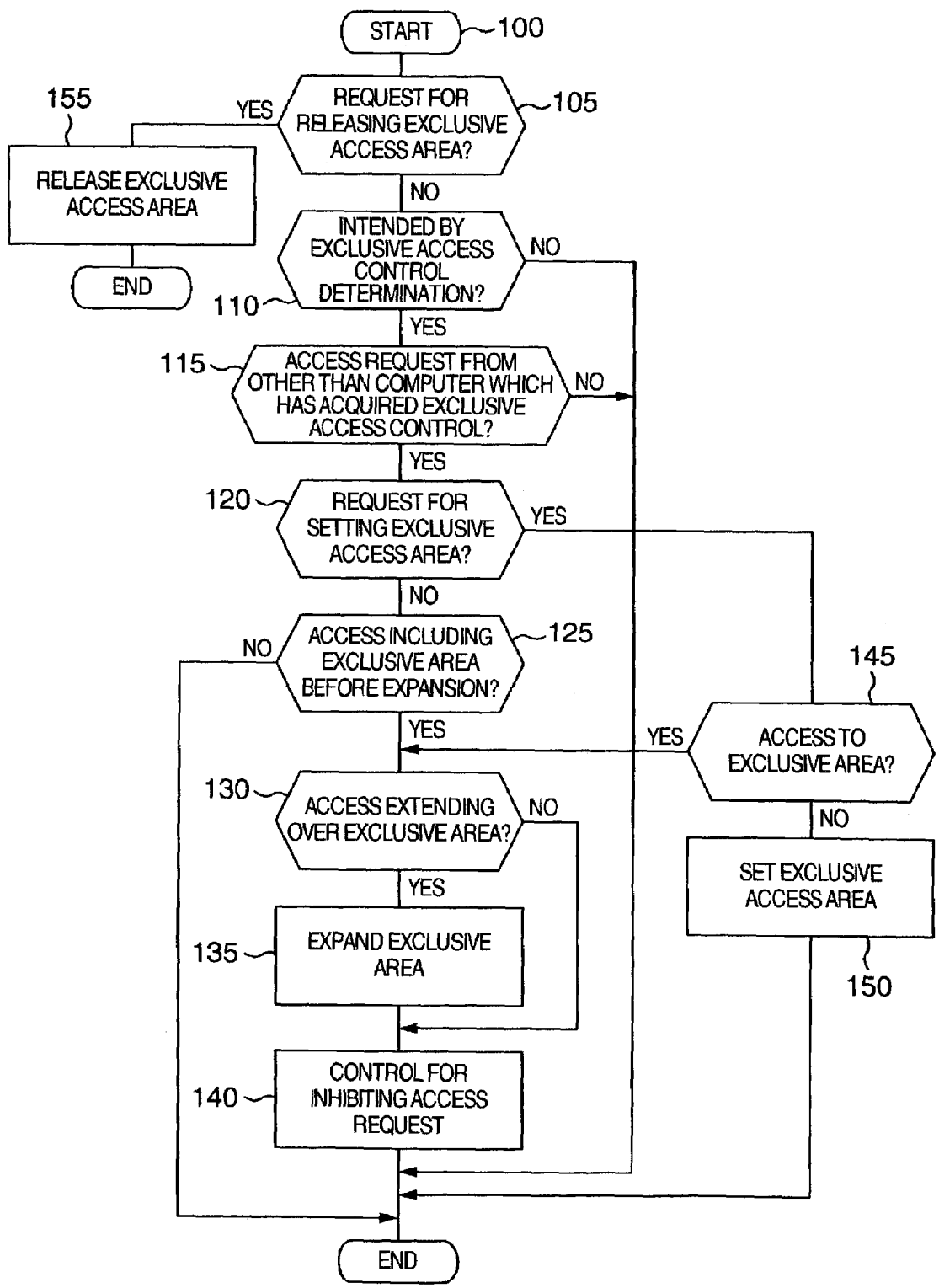
FIG. 4 is a flow chart illustrating an example of a processing procedure for an exclusive access control according to another embodiment of the present invention.

Referring next to FIG. 4, description will be made on a processing procedure (beginning at step 100) for the exclusive access control executed in the relay device 1100 in consideration of the avoidance of dead lock. The exclusive access control processing differs partially in the processing procedure when the relay device 1100 totally performs the exclusive access control processing (hereinafter called the "total processing case") and when the relay device provides an exclusive access control function to a storage device which does not have the exclusive access control function and a storage device executes the exclusive access control when the storage device has the exclusive access control function (hereinafter called the "selective processing case"). In the following, therefore, the processing procedure will be described separately for the respective cases.

4-1. Total Processing Case:

First, the total processing case will be described. The exclusive access control is made up of two types of processing or control: (1) setting and releasing an exclusive access area; and (2) control for determining the expansion of an exclusive access area and the inhibition of an exclusive access control upon acceptance of an access request.

(1) Setting and Release of Exclusive Access Area:

Upon receipt of an internal message from the classification unit 1280, the exclusive access determination unit 1230 in the I/O processing unit 1200 references an command descriptor block included in the internal message to determine the type of an access request frame received from a computer.

When the type of the access request frame is a request for releasing an exclusive access area (YES at step 105), the exclusive access control is released for an exclusive access area indicated by the access request frame (step 155). In this event, the exclusive access area release request is sent through the internal message from the I/O processing unit 1200 to the controller 1600. In the controller 1600, the control processor 1620 searches the detailed exclusive access information table 1612 stored in the control information storage unit 1610 for a table associated with a requesting computer (an originator ID included in an exclusive access area release request frame matches a requestor ID registered in the detailed exclusive access information table). When an identification number stored in the attribute section 2150 of the retrieved table matches an identification number of the exclusive access area release request frame, appropriate entries (i.e., the address section, area length, attribute, expanded address, expanded area length) are reset to zero. After the detailed exclusive access information table 1612 is updated, or when a table associated with the requesting computer cannot be extracted from the detailed exclusive access information table 1612, or when the identification number described in the attribute section does not match the identification number of the exclusive access area release frame, the controller 1600 extracts an I/O processing unit corresponded to an access target descriptor included in the exclusive access area release request frame from the general virtual configuration information table 1616, and transmits a request for changing the exclusive access information table 1245 to this I/O processing unit through an internal message. In the I/O processing unit which receives the internal message, the I/O processor 1220 searches the exclusive access information table 1245 for a table in which the originator ID included in the exclusive access area release request frame matches the requestor ID registered in the exclusive access information table 1245. When an identification number registered in the attribute section 2020 of the pertinent table matches the identification number contained in the exclusive access area release request frame, appropriate entries (i.e., the address section, area length, attribute) are set to zero. Then, the I/O processor of the I/O processing unit which receives the exclusive access area release request frame creates a response message indicative of the completion of the exclusive access area release processing, and transmits the response message to the computer which transmitted the exclusive access area release request frame. The exclusive access area release processing is terminated by the foregoing processing.

When an access request frame is a frame not intended by the exclusive access control for requesting such processing as acquisition of configuration information or sense information, which does not involve read/write with a storage device (NO at step 110), the exclusive access determination unit 1230 terminates the processing associated with the exclusive access control, and sends a signal indicating that the exclusive access control is not required to the I/O processor 1220.

When an access request frame is a frame intended by the exclusive access control (YES at step 110) and is an access request from a computer other than the computer that has acquired exclusive access control (YES at step 115), and is an access request frame which requests for setting of an exclusive access area (exclusive access area setting request frame) (YES at step 120), the exclusive access determination unit 1230 transmits a request for determination to the controller 1600 through an internal message.

In the controller 1600, the control processor 1620 determines based on the detailed exclusive access information table 1612 whether or not the exclusive access area setting request frame associated with the request for determination received from the exclusive access determination unit 1230 is a frame which involves a request for an access to a previously set exclusive access area (including an expanded exclusive access area). When the exclusive access area setting request frame does not involve a request for setting an exclusive access area in a storage area indicated by an address or an expanded address, and an area length or an expanded area length registered in the detailed exclusive access information table 1612 (NO at step 145), the control processor registers information contained in the exclusive access area setting request frame in the detailed exclusive access information table 1612. Even if the exclusive access area setting request frame involves a request for setting of an exclusive access area in a storage area indicated by the address 2110 and area length 2120 or the expanded address 2130 and expanded area length 2140 registered in the detailed exclusive access information table 1612, the information contained in the exclusive access area setting request frame is registered in the detailed exclusive access information table 1612 (step 150) if the control processor determines that an exclusive access can be permitted to a computer which has issued the exclusive access area setting request frame (NO at step 145), as a result of a comparison, made by the control processor, of attributes of the exclusive access area, requested for setting, with the attributes (read shared, exclusive write, exclusive read, read/write exclusive) registered in the attribute section 2150 of the detailed exclusive access information table.

Here, FIG. 5 shows combinations of the attribute information contained in exclusive access area setting request information and the attributes registered in the attribute section 2150 of the detailed exclusive access information table, which permit an exclusive access to a computer which has transmitted an exclusive access area setting request frame. For example, when the attribute information contained in the exclusive access area setting request frame is exclusive read, an exclusive access is permitted to the computer which has issued the exclusive access area setting request frame if the attribute information registered in the attribute section 2150 of the detailed exclusive access information table 1612 is exclusive write. However, no exclusive access can be permitted to the computer which has issued the exclusive access area setting request frame if the attribute information registered in the attribute section 2150 of the detailed information table 1612 is exclusive read.

Information registered by the control processor in the detailed exclusive access information table 1612 includes the start address, area length, and I/O attribute of an exclusive access area in the exclusive access area setting request frame. After updating the table, the control processor searches the general virtual configuration information table 1616 for an I/O processing unit corresponded to an access target descriptor indicated by the exclusive access area setting request frame, and transmits a request for changing the exclusive access information table to this I/O processing unit. In the I/O processing unit, the I/O processor registers values (start address, area length, I/O attribute) similar to the values registered in the detailed exclusive access information table in appropriate entries of the exclusive access information table 1245 stored in the I/O information storage unit. Then, the I/O processor of the I/O processing unit which has received the exclusive access area setting request frame creates a response message indicative of the completion of the exclusive access area setting processing, and transmits the response message to the computer which transmitted the exclusive access area setting request frame, followed by termination of the processing.

(2) Control for Expansion and Inhibition of Exclusive Access Area:

When an access request frame received from a computer is a frame intended by the exclusive access control (YES at step 110) but not an exclusive access area setting request frame (NO at step 120), the exclusive access determination unit 1230 determines based on the exclusive access information table 1245 whether or not it is an access request frame which involves a request for an access to a storage area including an exclusive access area (exclusive access area before expansion) which is set upon receipt of an exclusive access area setting request frame, and determines based on the table shown in FIG. 5, when the access request frame involves a request for an access to the storage area including the exclusive access area before expansion, whether or not the computer can be permitted to access the exclusive access area (step 125).

As a result of the determination, when the access request frame does not include a request for an access to the exclusive access area before expansion, or when the exclusive access area is an exclusive access area which can be accessed, based on the table of FIG. 5, even if the access request frame includes a request for an access to the exclusive access area before expansion (NO at step 125), the exclusive access determination unit 1230 transmits to the I/O processor 1220 a signal indicating that the exclusive access control is not required, followed by termination of the processing.

As a result of the determination, when it is determined that the access request frame includes a request for an access to the exclusive access area before expansion, and that the exclusive access area is an exclusive access area to which no access can be made, based on the table of FIG. 5, the exclusive access determination unit 1230 transmits to the controller 1600 an internal message for requesting a determination as to whether or not the access request frame received from the computer extends over the exclusive access area (whether or not the access area includes the exclusive access area and also includes another storage area). Then, the control processor 1620 of the controller 1600 determines based on the detailed exclusive access information table 1612 whether or not the access area indicated by the access request frame received from the computer extends over the exclusive access area previously set at the time of the determination (step 130). When it is determined at step 145 that the exclusive access area setting request frame received from the computer includes an exclusive access area setting request for the previously set exclusive access area and also includes an exclusive access area setting request for the exclusive access area to which no exclusive access can be permitted, as determined based on FIG. 5, the processing shown at the aforementioned step 130 is also executed.

When the access area extends over the exclusive access area (YES at step 130), the control processor 1620 calculates the start address and exclusive area length of the exclusive access area such that it includes the access area indicated by the access request frame received by the computer. Then, the control processor 1600 updates the expanded address section 2130 and expanded area length 2140 in appropriate entries in the detailed exclusive access information table 1612 to reflect the result of the calculation to the table (step 135).

After updating the detailed exclusive access information table, or when it is determined at step 130 that the access area does not extend over the exclusive access area (NO at step 130), the control processor 1600 returns the internal message to the I/O processing unit which issued the internal message. The I/O processing unit which receives the internal message performs the processing for inhibiting the access request received from the computer. The inhibition processing is executed in such a manner that the I/O processor 1220 in the I/O processing unit creates a response which clearly indicates that the access request is inhibited by an exclusive hit, and returns the response to the computer which transmitted the access request frame (step 140).

4-2. Selective Processing Case:

Next, the selective processing case will be described with reference to FIG. 4.

(1) Setting and Release of Exclusive Access Area:

Upon receipt of an internal message from the classification unit 1280, the exclusive access determination unit 1230 in the I/O processing unit 1200 determines the type of an access request frame received from a computer with reference to an command descriptor block included in the internal message.

When the access request frame is an exclusive access area release request frame (YES at step 105), the associated exclusive access area is released from the exclusive access control (step 155). In this event, the exclusive access area release request is sent from the I/O processing unit 1200 to the controller 1600 through an internal message. In the controller 1600, the control processor 1620 searches the detailed exclusive access information table 1612 stored in the control information storage unit 1610 for a table associated with the requesting computer (the originator ID included in the exclusive access area release request frame matches a requester ID registered in the detailed exclusive access information table). When the identification number stored in the attribute section 2150 in the retrieved table matches the identification number of the exclusive access area release request frame, the appropriate entries (i.e., the address section, area length, attribute, expanded address, expanded area length) are reset to zero. Also, the control processor 1620 resets all entries on the detailed exclusive access information table, which is not registered with the ID of the requesting computer, to zero. After updating the detailed exclusive access information table 1612, or when the table associated with the requesting computer cannot be extracted from the detailed exclusive access information table 1612, or when the identification number stored in the attribute section does not match the identification number of the exclusive access area release frame, the controller 1600 extracts from the general virtual configuration information table 1616 an I/O processing unit which is corresponded to an access target descriptor included in the exclusive access area release request frame, and transmits a request for changing the exclusive access information table 1245 to this I/O processing unit through an internal message. In the I/O processing unit which receives the internal message, the I/O processor 1220 searches the exclusive access information table 1245 for a table in which has a requester ID registered in the exclusive access information table 1245 matches the originator ID included in the exclusive access area release request frame. When the identification number registered in the attribute section 2020 of the retrieved table matches the identification number contained in the exclusive access area release request frame, appropriate entries (i.e., the address section, area length, attribute) are set to zero.

After transmitting the internal message to the I/O processing unit, the control processor acquires from the general virtual configuration information table 1616 a real access target descriptor which is registered in correspondence to an access target descriptor indicated by the exclusive access area release request frame, and transmits an internal message to the I/O processing unit connected to a real storage device indicated by the real access target descriptor to transmit an access area release request to the real storage device. The I/O processing unit which receives the internal message transmits an exclusive access area release request to the storage device. Upon receipt of responses from all storage devices to which the exclusive access area release request was transmitted from the I/O processing unit, the control processor transmits an internal message to the I/O processor 1220 which is connected to the computer that transmitted the exclusive access area release request frame. The I/O processor which receives this internal message creates a response message indicating the completion of the exclusive access area release processing, and transmits this to the computer which transmitted the exclusive access area release request frame, followed by termination of the processing involved in the exclusive access area release request.

When the access request frame is a frame not intended by the exclusive access control without read/write with a storage device, such as acquisition of configuration information or sense information (NO at step 110), the exclusive access determination unit 1230 terminates the processing associated with the exclusive access control, and transmits to the I/O processor 1220 a signal indicating that the exclusive access control is not required.

When the access request frame is a frame intended by the exclusive access control and includes an exclusive access area setting request (YES at step 120), the exclusive access determination unit 1230 transmits a request for determination to the controller 1600 through an internal message.

In the controller 1600, the control processor 1620 determines based on the detailed exclusive access information table 1612 whether or not an exclusive access area setting request frame associated with the determination request received from the exclusive access determination unit 1230 is a frame which involves a request for an access to a previously set exclusive access area (including an expanded exclusive access area). When the exclusive access area setting request frame involves a request for an access to the previously set exclusive access area (including an expanded exclusive access area), and includes an exclusive access area setting request for an exclusive access area to which no exclusive access can be permitted, as determined based on FIG. 5 (YES at step 145), the processing shown at step 130 is executed. When the exclusive access area setting request frame does not involve an exclusive access area setting request to a storage area indicated by the address and area length or by the expanded address and expanded area length registered in the detailed exclusive access information table 1612, or when the control processor 1620 determines that an exclusive access can be permitted to the computer which issued the exclusive access area setting request frame as a result of a comparison, made by the control processor 1620 based on FIG. 5, of attributes of the exclusive access area, requested for setting, with the attributes registered in the attribute section 2150 of the detailed exclusive access information table, the control processor executes the following processing, even if the exclusive access area setting request frame involves a request for setting an exclusive access area in the storage area indicated by the address 2110 and area length or by the expanded address 2130 and expanded area length registered in the detailed exclusive access information table 1612.

The control processor acquires from the general virtual configuration information table 1616 a real access target descriptor corresponded to an access target descriptor contained in the exclusive access area setting request frame, and storage device attribute information indicating whether or not a storage device which includes a real volume indicated by the real access target descriptor has the exclusive access control function. The control processor references the acquired attribute information, and when a storage device having the exclusive access control function exists, the control processor transmits an internal message to an I/O processing unit connected to the storage device having the exclusive access control function for instructing the I/O processing unit to duplicate the exclusive access area setting request frame and transmits this to the storage device. In the I/O processing unit which receives the internal message, the I/O processor generates a copy of the exclusive access area setting request frame, transmits this to the storage device, and waits for a response from the storage device. When the I/O processing unit receives a response, the response is transmitted to the controller, and the control processor 1620 analyzes the contents of the response.

When the response indicates that an exclusive access area has already been set by a request from another computer (hereinafter called the "device hit"), this falls under YES resulting from the determination at step 145. In this event, the control processor transmits an internal message to the I/O processing unit connected to the storage device to which the exclusive access area setting request frame was transmitted, for instructing the I/O processing unit to generate an exclusive access area release request having the same identification number as the identification number of exclusive access control contained in the exclusive access area setting request frame, and to transmit this request to the storage device. Upon receipt of the internal message, the I/O processing unit creates an exclusive access area release request based on the internal message, transmits this request to the storage device, and waits for a response from the storage device. After the I/O processing unit receives responses from all storage devices to which the exclusive access area release request was transmitted, the processing shown at step 130 is executed.

When all the responses received from the storage devices indicate that an exclusive access area has been set (not a device hit), or when the control processor reveals from the result of referencing the attribute information acquired from the general virtual configuration information table 1616 that no storage device has the exclusive access control function, the control processor registers information contained in the exclusive access area setting request frame received from the computer in the detailed exclusive access information table 1612. The registered information includes the start address, area length, and I/O attribute of an exclusive area. After updating the detailed table, the control processor searches the general virtual configuration information table associated with an I/O processing unit corresponded to an access target descriptor contained in the exclusive access area setting request frame, and transmits a request for changing the exclusive access information table to this I/O processing unit. In the I/O processing unit which receives the request for the change, the I/O processor registers values (start address, area length, I/O attribute) similar to the values registered in the detailed exclusive access information table in appropriate entries of the exclusive access information table 1245 stored in the I/O information storage unit. Then, the I/O processor creates a response message indicative of the completion of the exclusive access area setting processing, and transmits the response message to the computer which transmitted the exclusive access area setting request frame, followed by termination of the processing.

(2) Control for Expansion and Inhibition of Exclusive Access Area of Access Request:

When the access request frame received from a computer is a frame intended by the exclusive access control (YES at step 110), and when the access request frame is not an exclusive access area setting request (NO at step 120), the exclusive access determination unit 1230 determines based on the exclusive access information table 1245 whether or not the received access request frame involves a request for an access to a storage area including an exclusive access area before expansion of a set exclusive access area, and determines based on the table shown in FIG. 5, when it involves a request for an access to the storage area including an exclusive access area before expansion, whether or not the exclusive access area is an exclusive access area to which an access can be permitted (step 125).

As a result of the determination, when the access request frame does not include a request for an access to the exclusive access area before expansion, or when the exclusive access area is an exclusive access area which can be accessed, based on the table of FIG. 5, even if the access request frame includes a request for an access to the exclusive access area before expansion (NO at step 125), the exclusive access determination unit 1230 transmits to the I/O processor 1220 a signal indicating that the exclusive access control is not required, followed by termination of the processing.

As a result of the determination, when the access request frame includes a request for an access to the exclusive access area before expansion, and when the exclusive access area is an exclusive access area to which no access can be made, based on the table of FIG. 5, the exclusive access determination unit 1230 transmits to the controller 1600 an internal message for instructing the same to determine whether or not an access area indicated by the access request frame received from the computer extends over the exclusive access area. The control processor 1620 of the controller which receives the internal message determines based on the detailed exclusive access information table 1612 whether or not the access area indicated by the access request frame extends over the exclusive access area (step 130).

When the access area extends over the exclusive access area (YES at step 130), the control processor 1600 calculates a start address and an exclusive area length for an exclusive access area such that it includes the access area indicated by the access request frame received by the computer. Then, the control processor 1600 updates the expanded address section 2130 and expanded area length 2140 in appropriate entries in the detailed exclusive access information table 1612 to reflect the result of the calculation to the table (step 135).

When it is determined at step 145 that a device hit occurs even if the access area does not extend over the exclusive access area at step 135, spacial area expansion processing is executed. Specifically, the control processor creates detailed exclusive access information entries which do not include a requesting computer (do not include a requester ID), and registers the start address and area length contained in the exclusive access area setting request frame received from the computer in the expanded address section 2130 and expanded area length 2140, respectively, of the entries. The control processor also registers "read/write exclusive" in the I/O attribute 2150 in the detailed exclusive access information table as the type of exclusive access, and registers zero as the identification number of the exclusive access control.

After updating the detailed exclusive access information table, or when it is determined at step 130 that the access area does not extend into the exclusive access area so that the detailed exclusive access information table need not be updated (NO at step 130), the control processor 1600 transmits an internal message to an I/O processing unit connected to the computer which transmitted the access request frame for instructing the same to inhibit the access request. The I/O processor 1220 of the I/O processing unit which receives the internal message creates a response which clearly indicates the contents of the inhibited access request, and transmits the response to the computer which transmitted the access request frame.

As described above, the relay device 1100 capable of the virtualization processing only intends an access request subjected to the virtualization processing for the exclusive access control. The I/O processing unit in the relay device only detects an access request which requires the exclusive access control, such that the controller 1600 makes a detailed exclusive access control determination only on the access request selected by the I/O processing unit. As a result, it is possible to distribute a load of the exclusive access control determination and efficiently implement the exclusive access control.

Also, the access inhibition processing is executed between the computer 1000 and relay device 1100 on those of access requests issued by the computer 1000 which must be inhibited, as a result of the exclusive access control determination. Thus, an access rejection response and a re-issued access request, caused by the exclusive access control, are transmitted and received between the relay device and the computer which re-issues the access request, so that no influence will is exerted on the performance of the communication line 1135 between the relay device and storage device. Therefore, when a computer which has acquired an exclusive access right is to access an exclusive access area, or when another computer is to access a storage area other than the exclusive access area, no influence will be exerted by an access rejection response and an access request re-issued by a computer which has been rejected an access.

Further, even when a storage device is not equipped with the exclusive access control function, the relay device may assign to this storage device a virtual volume having the same capacity as a storage capacity possessed by the storage device, and provides the exclusive access control function for the virtual volume, thereby making it possible to execute the exclusive access control. Also, when a plurality of storage devices connected to a network include a mixture of storage devices having the exclusive access control function and storage devices not having the exclusive access control function, the relay device instructs the storage devices having the exclusive access control function to execute the exclusive access control, while the relay device executes the exclusive access control function for virtual volumes, as described above, for the storage devices which do not have the exclusive access control function, thereby making it possible to provide the exclusive access control function. In addition, irrespective of whether or not a storage device has the exclusive access control function, the relay device can provide all storage devices with the exclusive access control function.

When the relay device has the virtualization function, 1) the relay device uniformly provides all virtual volumes with the exclusive access control function, or 2) storage devices not having the exclusive access control function, within storage devices associated with virtual volumes, may be previously registered in the relay device, so that the relay device provides the exclusive access control function to the virtual volumes of the storage devices not having the exclusive access control function, whereby it appears to a computer that the volumes uniformly have the exclusive access control function.

Next, another embodiment of the present invention will be described. This embodiment will be described in connection with a method for the relay device to instruct a local cache memory (writhe through type) contained in a computer with the intention to temporarily store data on a storage device to maintain the compatibility between data on the storage device and data on the local cache memory. Specifically, the relay device 1100 has an access log table for preserving the log of read access requests received from computers, specifies data which should be invalidated in data stored in the cache on the computer based on the access log table, and transmits an invalidation request message to the computer which has the cache upon occurrence of a predefined event.

While the system configuration is substantially similar to the system configuration illustrated in FIG. 1, the control information storage unit 1610 of the relay device 1100 has the access log table 1614 for storing the log of access requests. FIG. 9 shows an example of the access log table. The access log table is created for each of volumes provided to computers. The access log table has an entry 2200 for each computer, for each logical block address, or for a predetermined number of blocks. The entry takes a binary number, 0 or 1, wherein "1" indicates that a read access request has been made in the past from a computer corresponding to the entry to a concerned address in a logical block corresponding to the entry.

The control processor of the relay device utilizes an internal message generated by the classification unit 1280 to determine whether an access request frame received from a computer is associated with a read access request, and updates the access log table. Specifically, as the relay device 1100 receives a read access request frame from the computer 1000, the classification unit 1280 generates an internal message. This internal message is transmitted from the communication I/F unit 1250 to the controller 1600. In the controller 1600, the control processor 1620 analyzes an command descriptor block and a real access target descriptor contained in the internal message, and when determining that the access request frame received from the computer is associated with a read access request, registers "1" in the entry of the access log table 1614 corresponding to the access target descriptor and the computer which transmitted the access request frame. Alternatively, the internal message received by the controller may be once buffered in the I/O information storage unit 1610 in the I/O processing unit, such that the access log table may be updated at a particular timing. In this event, the controller 1600 cannot specify the contents of a buffered internal message before the particular timing reaches. Therefore, when the I/O processing unit fails, the invalidation processing must be executed over an entire local memory of a computer connected to the I/O processing unit.

The invalidation request message is generated when the relay device 1100 receives a write access request or an exclusive access area setting request. Specifically, when the relay device receives a write access request frame or an exclusive access area setting request frame from a computer, the classifier unit 1280 generates an internal message which is transmitted to the controller 1600. The control processor 1620 analyzes the internal message to acquire the access log from the entry of an access log table corresponding to an access area indicated by an access target descriptor contained in the internal message. Then, the controller identifies a computer and a storage area subjected to the invalidation (corresponding to the entry registered with "1") from the acquired access log, and transmits an internal message including information indicative of the storage area to be invalidated to an I/O processing unit which communicates with the computer subjected to the invalidation. After transmitting the internal message, the control processor 1620 resets the entry, by which the access log was acquired, to zero.

In the I/O processing unit, the I/O processor creates the invalidation request message to be sent to the computer, using the internal message received from the controller. The invalidation request message is transmitted as an event notice which is asynchronously transmitted to the computer. As the computer receives the invalidation request message, a network driver or OS invalidates the cache 1005 based on the invalidation request message.

As described above, in the relay device 1100, the I/O processing unit detects the reception of a read-based access request, and the controller 1600 updates the access log table 1614 based on the result of the detection to hold the access log. When the I/O processing unit receives a predetermined type of access request, the controller references the access log table, and instructs the I/O processing unit to create an invalidation request message. The I/O processing unit creates the invalidation message based on the instruction from the controller, and transmits this message to the computer. As a result, the cache is invalidated in the computer.

Figure 10:
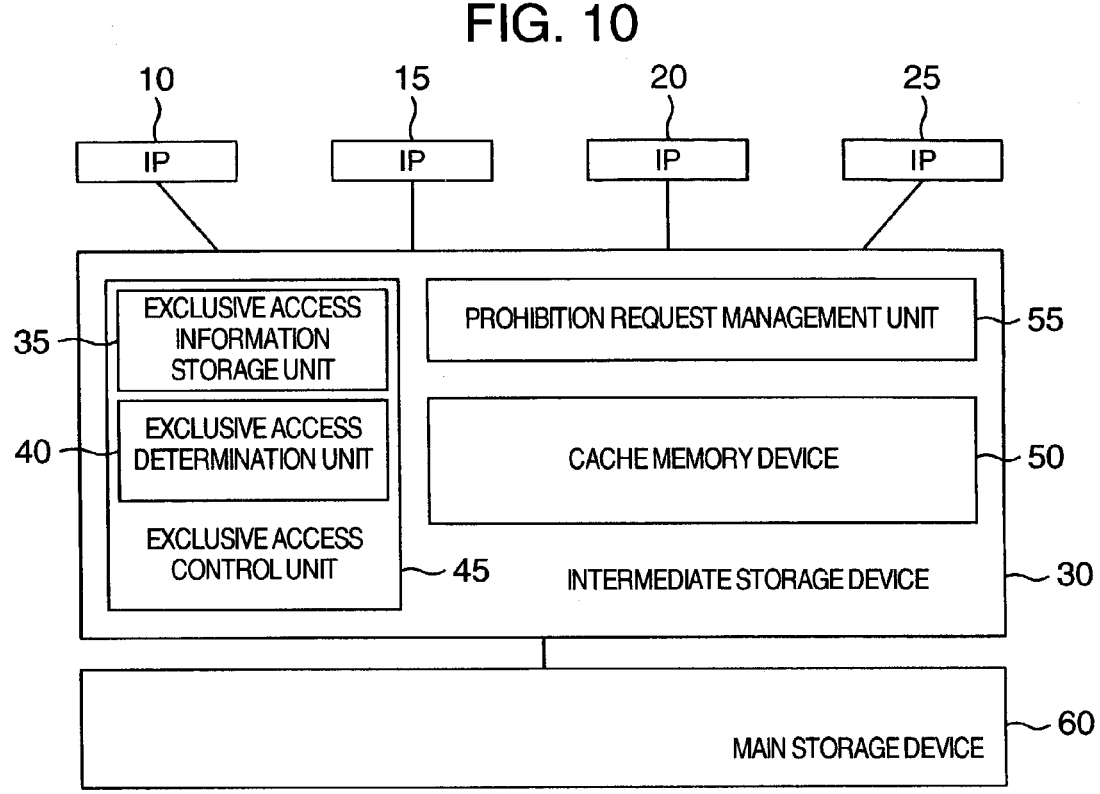
FIG. 10 shows an exemplary configuration of a memory system.

The exclusive access control method having the processing for avoiding the dead lock can be executed in a memory system which has a main storage device connected to a plurality of processors. FIG. 10 illustrates an exemplary memory system. The memory system comprises a plurality of processors (IP) 10; a main storage device 60; and an intermediate storage device 30 for connecting the plurality of processors and the main storage device 60. The intermediate storage device 30 comprises a cache memory device 50; an exclusive access control unit 45; and a inhibition request management unit 55. The exclusive access control unit 45 further comprises an exclusive access information storage unit 35 and an exclusive access determination unit 40. The exclusive access control is mainly executed by the exclusive access control unit 45. In the exclusive access control unit 45, information required for the exclusive access control is stored in the exclusive access information storage unit 35, and the exclusive access determination unit 40 makes a determination executed in the exclusive access control processing, as shown in FIG. 4. If the result of the determination shows that a memory request must be inhibited, the inhibition request management unit 55 performs the inhibition processing.

Other than the memory system in FIG. 10, the exclusive access control method having the processing for avoiding the dead lock can be executed likewise in a storage device which contains a file system in the device itself (NAS: Network Attached Storage).

The present invention can prevent degraded performance of a network caused by the exclusive access control, and permit a computer to exclusively access a storage area irrespective of whether or not a storage device has the exclusive access control function.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A relay device for connection with a plurality of computers and one or a plurality of storage devices, comprising:
   a computer port for connection with said plurality of computers;
   a storage device port for connection with said one or plurality of storage devices;
   a processor; and
   a memory,
   wherein when said relay device receives through said computer port a first access request from a first computer for requesting an exclusive access to a first storage area in said one or plurality of storage devices,
   said processor stores in said memory first information indicating that said first storage area is an exclusive access area,
   wherein when said relay device receives through said computer port a second access request from a second computer for requesting an access to a second storage area that is wider than said first storage area and includes said first storage area,
   said processor transmits, based on said first information, an access rejection response to said second computer, and
   wherein when said second access request is received by said relay device for requesting an access to a second storage area that is wider than said first storage area and includes said first storage area, said processor expands the exclusive access area to an access width of said second access request and stores in said memory second information indicating that said second storage area is an expanded exclusive access area.

2. A relay device according to claim 1, wherein:
   when said relay device receives through said computer port a release request from said first computer for requesting to release the exclusive access area,
   said processor erases said first and second information from said memory.

3. A relay device according to claim 1, wherein:
   when said relay device receives a third access request from a third computer through said computer port for requesting an access to said second storage area,
   said processor transmits, based on said second information, an access rejection response to said third computer.

4. A relay device according to claim 1, wherein:
   when said relay device receives an access request from said first computer through said computer port for requesting a read of data from a storage area on said one or plurality of storage devices,
   said processor stores in said memory third information indicating that said first computer has accessed said storage area, and
   when said relay device receives an access request from said second computer through said computer port for requesting a write of data into said storage area,
   said processor transmits an invalidation message to said first computer based on said third information for notifying that said first computer does not use data stored in a cache memory contained in said first computer.

5. A relay device according to claim 1, further comprising means for determining whether the storage device connected to the storage device port has an exclusive control function.

6. In a relay device connected to a plurality of computers and one or a plurality of storage devices, the relay device including a first group of ports adapted to be connected to the computers, a second group of ports adapted to be connected to the storage devices, first and second groups of input/output (I/O) processing units respectively connected to the ports of the first and second groups and each I/O processing unit having a limited exclusive access function, a controller having an overall exclusive access control function and for controlling the relay device and a switching unit connected to the I/O processing units and for switching a path between the first group of I/O processing units and the second group of I/O processing units, each I/O processing unit comprising a processor and a memory, an access control method for controlling an access from each of said plurality of computers to a storage area in a virtual volume allocated to said one or plurality of storage devices, comprising the steps of:

receiving a first access request from a first computer for requesting an exclusive access to a first storage area in a virtual volume allocated to said one or plurality of storage devices at a first I/O processing unit corresponding to the first computer, said first storage area being designated by a start address and an area length included in said first access request;

specifying said first access storage area as an exclusive access area;

receiving a second access request from a second computer for requesting an access to a second storage area that is wider than said first storage area and includes said first storage area at a second I/O processing unit corresponding to the second computer;

transmitting an access rejection response to said second computer as a response to said second access request at the second I/O processing unit;

receiving a release request from said first computer for releasing a specified exclusive access area at the first I/O processing unit;

releasing the specified exclusive access area based on said release request;

transmitting information contained in said second access request to a storage device which has said first storage area from the first I/O processing unit; and when said second access request is an access request for requesting an access to the second storage area, which is designated by a start address and an area length included in said second access request, wherein said second storage area is wider than said first storage area and includes said first storage area, specifying said second storage area in addition to said first storage area as an exclusive access area and expanding the exclusive access area to an access width of said second access request.

7. An access control method according to claim 6, further comprising the steps of:

at a third I/O processing unit corresponding to a third computer, receiving a third access request from the third computer for requesting an access to a storage area included in said first storage area and said second storage area; and transmitting an access rejection response to said third computer as a response to said third access request.

8. A relay device which is connected to computers and storage devices via a network, comprising:

a first group of ports adapted to be connected to the computers;

a second group of ports adapted to be connected to the storage devices;

first and second groups of input/output (I/O) processing units respectively connected to the ports of the first and second groups and each I/O processing unit having a limited exclusive access function;

a controller having an overall exclusive access control function and for controlling the relay device; and a switching unit connected to the I/O processing units and for switching a path between the first group of I/O processing units and the second group of I/O processing units, each I/O processing unit comprising a processor and a memory, and wherein when a first one of the I/O processing units receives through a first one of the first group of ports a first access request from a first one of the computers for requesting an exclusive access to a first storage area allocated in at least one of the storage devices, said processor of the first I/O processing unit stores in the memory of each I/O processing unit first information indicating that said first storage area is an exclusive access area, and wherein when a second I/O processing unit receives through a second one of the first group of ports a second access request from a second one of the computers for requesting an access to a second storage area that is wider than said first storage area and includes said first storage area, the processor of the second I/O processing unit controls, based on said first information, transmission of an access rejection response to the second computer, and wherein when said second access request is an access request for requesting an access to the second storage area that is wider than said first storage area and includes said first storage area, said processor of the second I/O processing unit expands the exclusive access area to an access width of said second access request and stores in the memory of each I/O processing unit second information indicating that said second storage area is an expanded exclusive access area.

9. A relay device according to claim 8, wherein exclusive access information on the storage devices is partially stored in the memory of each I/O processing unit and all of the exclusive access information is stored in a memory of the controller, whereby the relay device conducts two-mode exclusive access control in which the I/O processing unit subjects to exclusive control by the controller when fails by itself.

10. A relay device for connection with a plurality of computers and one or a plurality of storage devices comprising:

a computer port for connection with said plurality of computers;

a storage device port for connection with said one or plurality of storage devices;

a processor; and a memory, wherein when said relay device receives through said computer port a first access request from a first computer for requesting an exclusive access to a first virtual storage area identified by said first computer, said processor generates a first real storage area that corresponds to said first virtual storage area and is allocated on said one or plurality of storage devices, and stores in said memory first information indicating that said first real storage area is an exclusive access area, wherein when said relay device receives through said computer port a second access request from a second computer for requesting an access to a second virtual storage area identified by said second computer, said processor generates from said second virtual storage area a second real storage area that corresponds to said second virtual storage area and is allocated on said one or plurality of storage devices and transmits, based on said first information, an access rejection response to the second computer if said second real storage area has a relation with said first real storage area, and wherein when said second real storage area is wider than said first real storage area and includes said first real storage area, said processor expands the exclusive access area to an access width of said second access request and stores in said memory second information indicating that said second real storage area is an exclusive access area.

11. A relay device according to claim 10, wherein:

when said relay device receives through said computer port a release request from said first computer for requesting to release the exclusive access area, said processor erases said first and second information from said memory.

12. A relay device according to claim 10, wherein:

when said relay device receives a third access request from a third computer through said computer port for requesting an access to said second real storage area, said processor transmits, based on said second information, an access rejection response to said third computer.

13. A relay device according to claim 10, wherein:

when said relay device receives an access request from said first computer through said computer port for requesting a read of data from a storage area on said one or plurality of storage devices, said processor stores in said memory third information indicating that said first computer has accessed said storage area, and when said relay device receives an access request from said second computer through said computer port for requesting a write of data into said storage area, said processor transmits an invalidation message to said first computer based on said third information for notifying that said first computer does not use data stored in a cache memory contained in said first computer.

14. A relay device according to claim 10, further comprising means for determining whether the storage device connected to the storage device port has an exclusive control function.

* * * * *